United States Patent [19]
Derrick

[11] Patent Number: 5,854,653
[45] Date of Patent: Dec. 29, 1998

[54] MOTION QUALITY ENHANCEMENT WITH WHITE NOISE

[75] Inventor: John F. Derrick, Penfield, N.Y.

[73] Assignee: Xerox Corporation, Stamford, Conn.

[21] Appl. No.: 323,977

[22] Filed: Oct. 17, 1994

[51] Int. Cl.⁶ ............................. B41J 2/385; B41T 2/47; G01D 15/14; G02F 1/11
[52] U.S. Cl. ......................... 347/255; 347/115; 347/247; 358/296
[58] Field of Search ..................................... 347/115, 116, 347/247, 255, 251, 239, 240; 250/351; 355/327; 399/68, 74; 358/296

[56] References Cited

U.S. PATENT DOCUMENTS

| | | | |
|---|---|---|---|
| 4,697,904 | 10/1987 | Takahashi et al. | 250/351 |
| 5,255,007 | 10/1993 | Baky | 347/247 |
| 5,258,775 | 11/1993 | Casey et al. | 347/255 |
| 5,291,214 | 3/1994 | Baek et al. | 346/139 D |
| 5,444,525 | 8/1995 | Takahashi et al. | 347/115 |

*Primary Examiner*—Benjamin R. Fuller
*Assistant Examiner*—Raquel Yvette Gordon
*Attorney, Agent, or Firm*—Ronald F. Chapuran

[57] ABSTRACT

A modulator for modifying a scanning beam to project a halftone image onto a photosensitive surface including a sensor providing sensor signals in relation to the speed of the photosensitive surface, a converter responsive to the speed of the photosensitive surface to provide a signal representing an image quality factor for altering the modulation of the beam of the scanning system to adjust the projected image in relation to the speed of the photosensitive surface, the projected image including banding errors, and a random signal generator responsive to the sensor signals for generating random signals, the random signals altering the modulation of the beam of the scanning system to counter the banding errors on the projected image.

20 Claims, 6 Drawing Sheets

MOTION QUALITY ENHANCEMENT WITH WHITE NOISE

BACKGROUND OF THE INVENTION

The invention relates to motion correction, and more particularly, to motion correction by the introduction of white noise into a projected halftone image.

Motion quality errors in printing systems often result in objectionable image quality for customers. For example, in an electronic imaging machine having a moving photosensitive surface and a raster scanning system or print array to project black and white pixels onto the photosensitive surface, image error can be introduced if there are changes in the speed of movement of the photosensitive surface. A higher relative speed of the photosensitive surface results in the beams across the surface or print array projections becoming squeezed together. A lower relative speed of the photosensitive surface results in the beams across the surface or print array projections becoming spread apart. The effect on image quality, for example, can be degraded image elements, for example, black lines that are much narrower or broader than desired for acceptable quality.

In the prior art, more precise speed control of moving elements such as photoreceptors in reproduction machines, is accomplished by motor and speed control devices such as servo mechanisms. The difficulty with this alternative is that servo mechanisms are relatively complex and expensive solutions to the problem. Also, adding additional hardware is often very awkward and almost precludes the possibility of retrofitting existing machines. In addition, in the prior art, U.S. Pat. No. 5,258,775, assigned to the same assignee as the present invention, discloses a system to compensate for motion errors that degrade image quality by modifying the modulation of a scanning beam across a photosensitive surface in response to changes in speed of the photosensitive surface.

Although an improvement over other proposals, a difficulty with the system described in the '775 patent is that motion errors still exist for relatively small motion errors, particularly in halftone images in high resolution systems. These errors, resulting in banding or visible stripes, are accentuated as halftone dot frequency increases. In other words, at higher frequencies (especially above 60 Hz.), there is increased sensitivity of the eye to slight motion errors of a photreceptor belt.

It would be desirable, therefore, to be able to provide a relatively simple and economical system to compensate for image degradation due to relatively small motion errors in a halftone imaging system. It is an object, therefore, of the present invention to provide a new and improved system for compensating for banding that degrades halftone image quality due to relatively small motion errors. Another object of the present invention is to compensate for motion errors in relatively high frequency halftone images by introducing random noise bands in the projected image. Another object of the present invention is to eliminate banding on halftone images by modifying the modulation of a scanning beam across the photosensitive surface. Other advantages of the present invention will become apparent as the following description proceeds, and the features characterizing the invention will be pointed out with particularity in the claims annexed to and forming a part of this specification.

SUMMARY OF THE INVENTION

The present invention is concerned with a modulator for modifying a scanning beam to project a halftone image onto a photosensitive surface. A sensor provides sensor signals in relation to the speed of the photosensitive surface, and a converter responsive to the speed of the photosensitive surface provides a signal representing an image quality factor for altering the modulation of the beam of the scanning system to adjust the projected image in relation to the speed of the photosensitive surface. The projected image includes banding errors and a random signal generator responsive to the sensor signals generates random signals for altering the modulation of the beam of the scanning system to counter the banding errors on the projected image.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
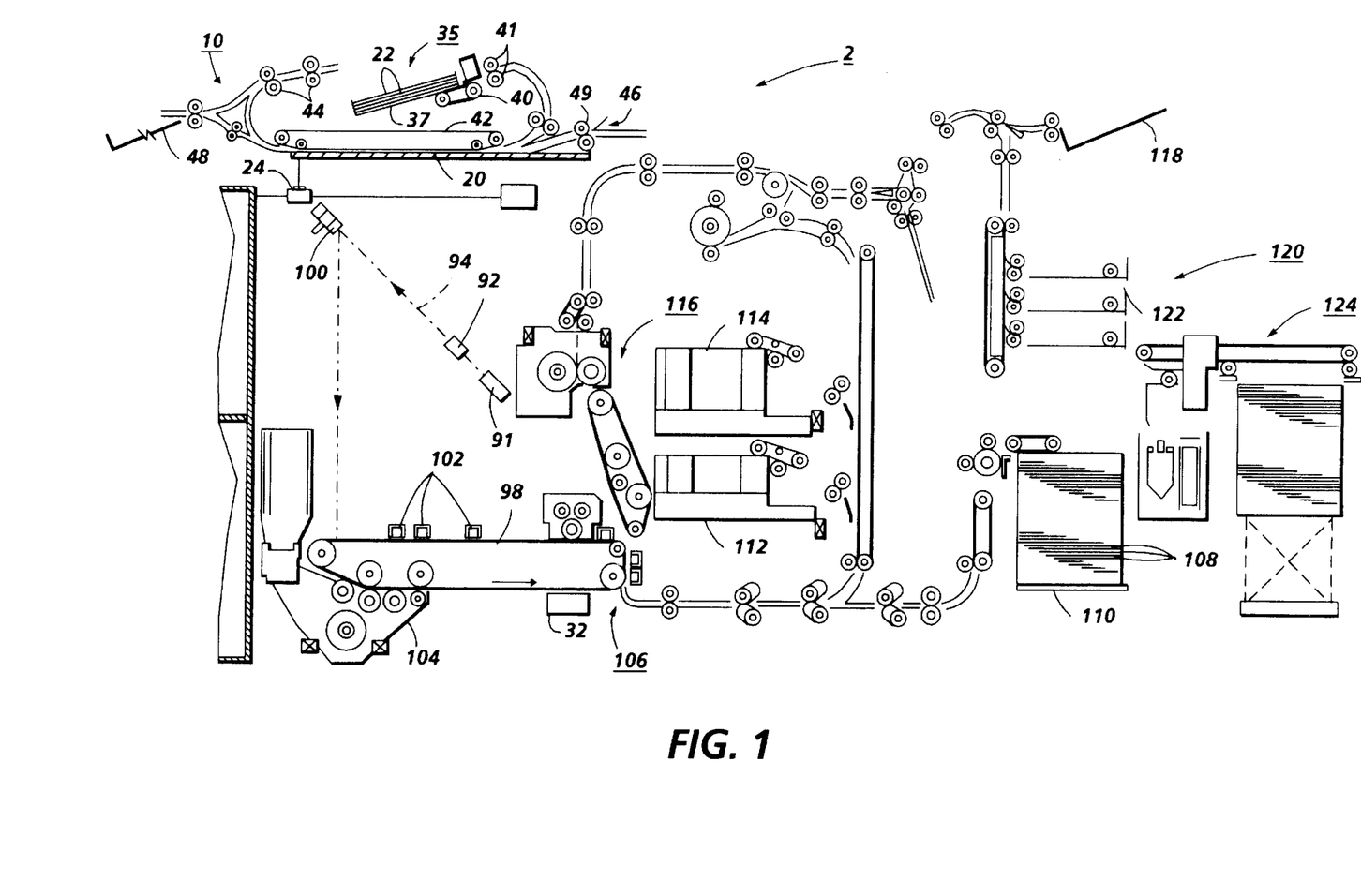
FIG. 1 is a plan view illustrating a typical electronic imaging system incorporating motion quality enhancement by use of white noise.
Figure 2:
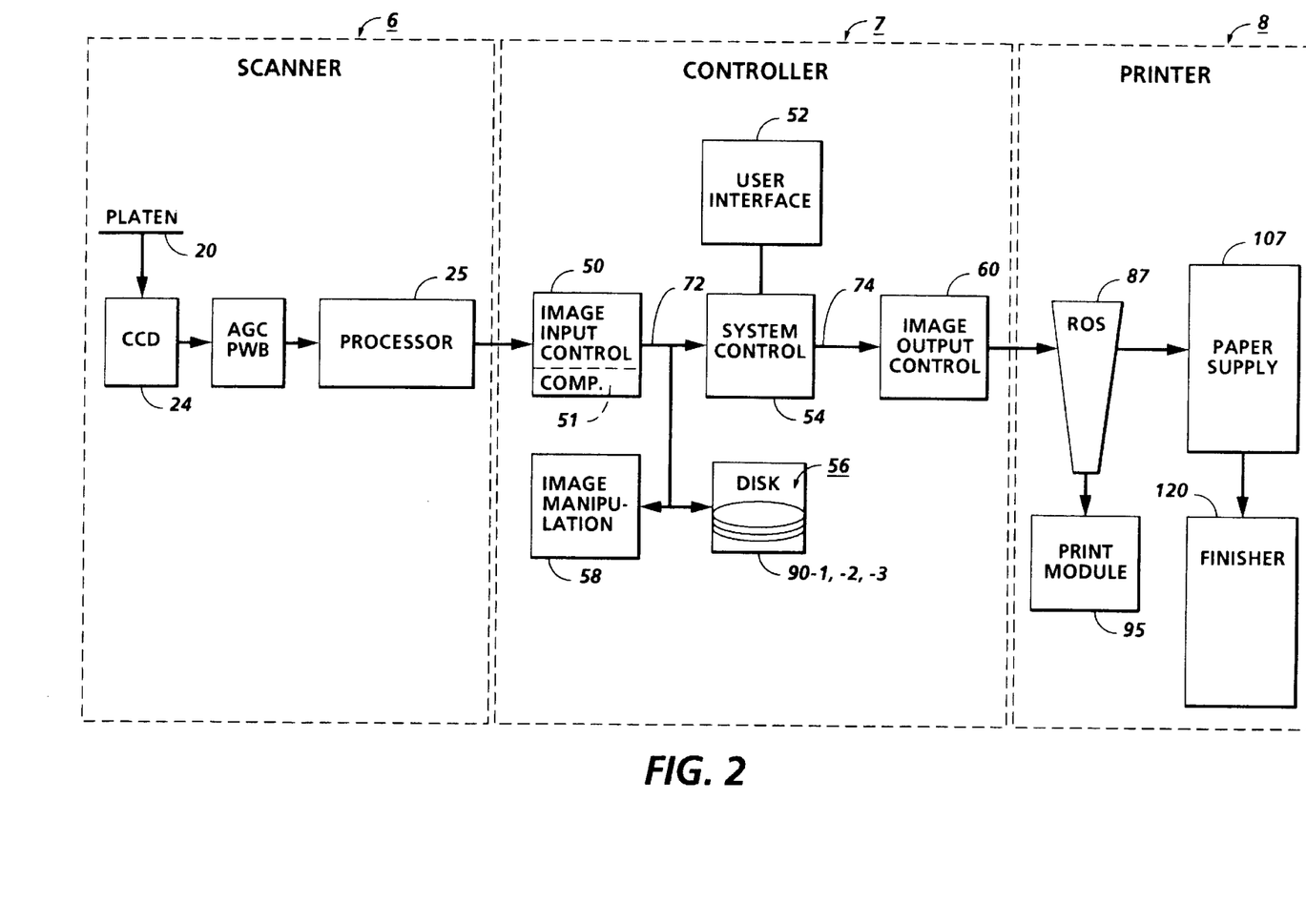
FIG. 2 is a block diagram depicting the major elements of the imaging system shown in FIG. 1.

Referring to FIGS. 1 and 2, there is shown an exemplary electronic imaging system 2 in accordance with the teachings of the present invention. Imaging system 2, for purposes of explanation, is divided into a scanner section 6, controller section 7, and printer section 8. While a specific printing system is shown and described, the present invention may be used with other types of printing systems, such as ink jet, ionographic, etc.

Scanner section 6 incorporates a transparent platen 20 on which the document 22 to be scanned is located. One or more linear arrays 24 are supported for reciprocating scanning movement below platen 20. A suitable (not shown) lens and mirrors cooperate to focus the array 24 on a line-like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25, for example, may provide enhancements and changes to the image signals such as filtering, thresholding, screening, cropping, etc.

Documents 22 to be scanned may be located on platen 20 for scanning by automatic document handler (ADF) 35, operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the manual mode, document handler 35 is pivoted upwardly to expose platen 20. This permits the document 22 to be manually placed on platen 20 following which array 24 is operated to scan the document. When scanning is completed, the document is removed to clear platen 20 for the next document. For Book mode, the book is manually positioned face down on platen 20 with the center line of the book aligned with positioning indicia (not shown) located along the border of platen 20. By programming the system, either one or both of the pages of the book open on the platen are scanned. The process is repeated for different pages of the book until all of the pages desired have been scanned following which the book is removed to clear platen 20.

For operation in the CFF mode, computer forms material is fed through slot 46 and advanced by feed rolls 49 to document feed belt 42 which in turn advances a page of the fanfold material into position on platen 20.

Printer section 8 comprises a laser type printer and, for purposes of explanation, is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotron 102 at a charging station preparatory to exposure by imaging beams 94.

The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112 or 114. The developed image transferred to the print media 108 is permanently fixed or fused by fuser 116, and the resulting prints discharged to either output tray 118, or to finisher 120. Finisher 120 includes a stitcher 122 for stitching or stapling the prints together to form books and a thermal binder 124 for adhesively binding the prints into books.

Controller section 7 is, for explanation purposes, divided into an image input controller 50, User Interface (UI) 52, system controller 54, main memory 56, image manipulation section 58 and image output controller 60. The scanned image data input from processor 25 of scanner section 6 to controller section 7 is compressed by image compressor/processor 51 of image input controller 50. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in a not shown system memory which comprises a Random Access Memory or RAM pending transfer to main memory 56 where the data is held pending use.

UI 52 includes a combined operator controller/CRT display consisting of an interactive touchscreen, keyboard, and mouse. UI 52 interfaces the operator with printing system 2, enabling the operator to program print jobs and other instructions, to obtain system operating information, instructions, programming information, diagnostic information, etc. Items displayed on the touchscreen such as files and icons are actuated by either touching the displayed item on the screen with a finger or by using a mouse to point a cursor to the item selected and keying the mouse. Main memory 56 has plural hard disks 90-1, 90-2, 90-3 for storing machine Operating System software, machine operating data, and the scanned image data currently being processed.

When the compressed image data in main memory 56 requires further processing, or is required for display on the touchscreen of UI 52, or is required by printer section 8, the data is accessed in main memory 56. Where further processing other than that provided by processor 25 is required, the data is transferred to image manipulation section 58 where the additional processing steps such as collation, make ready, decomposition, etc. are carried out. Following processing, the data may be returned to main memory 56, sent to UI 52 for display, or sent to image output controller 60.

Image data output to image output controller 60 is decompressed and readied for printing by not shown image generating processors. Following this, the data is output by suitable dispatch processors to printer section 8. Image data sent to printer section 8 for printing is normally purged from memory 56 to make room for new image data. For additional control detail, reference is made to U.S. Pat. No. 5,081,494 incorporated herein.

Figure 3:
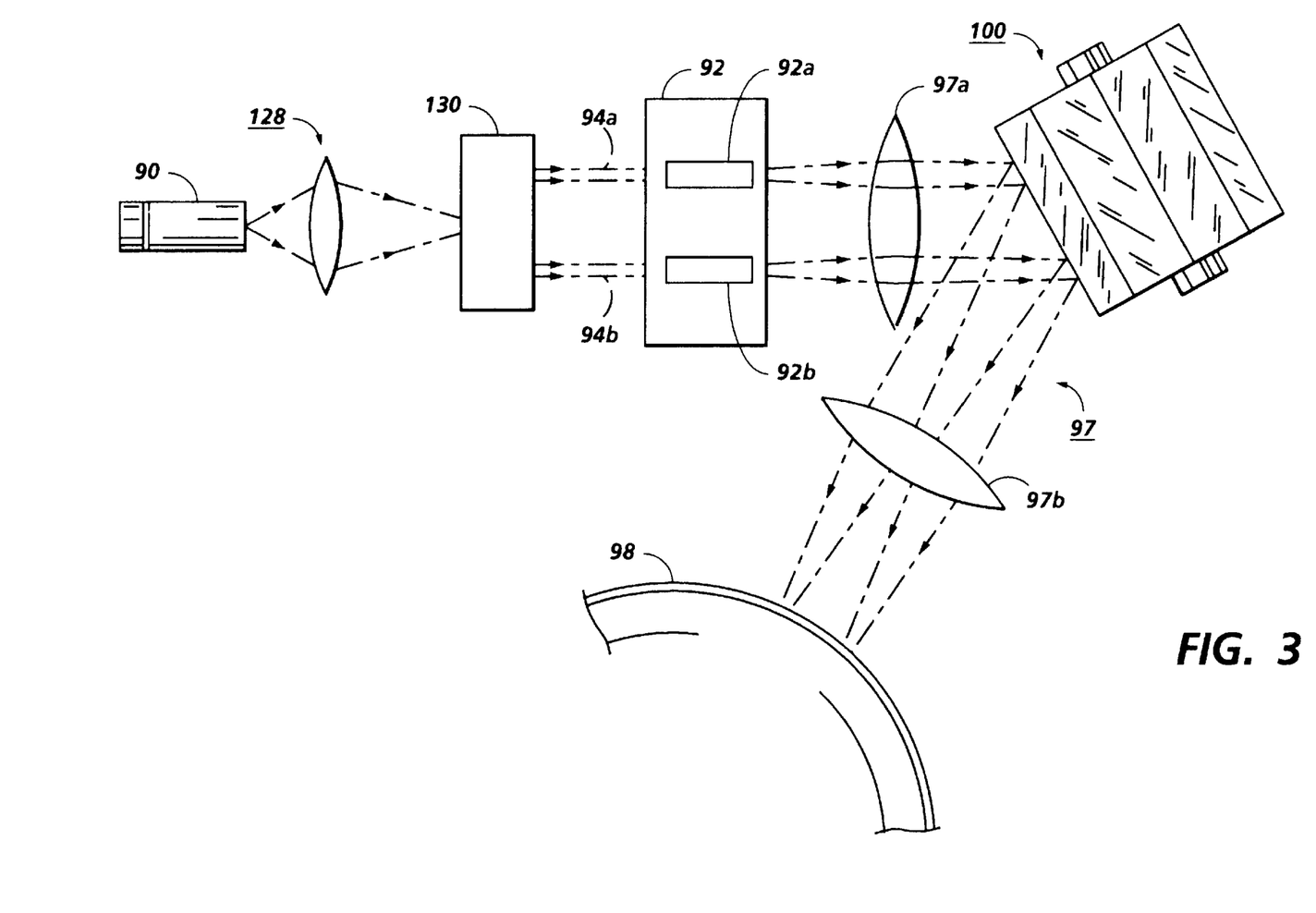
FIG. 3 is a schematic view of the raster output scanner of the imaging system shown in FIG. 1.

Referring to FIG. 3, there is shown a facet tracking raster output scanner which includes laser 90 for producing a beam of high intensity light. Laser 90 comprises a gas laser such as a heliumcadmium or a heliumneon laser. A diode laser with appropriate optics may also be used. The beam passes through suitable pre-modulator optics 128 which provides the desired light beam shape at modulator 92. The beam is shaped by pre-modulation optics 128 so as to have a generally elliptical cross section, the cross sectional width (w) of the beam in the fast scan direction being substantially larger than the cross sectional height (h) of the beam in the cross scan direction. Following pre-modulator optics, the beam is input to beam splitter 130 which splits the beam into a plurality of parallel beams 94a and 94b. Beams 94a and 94b are separated from one another by a distance sufficient to prevent interference or crosstalk between the beams.

Figure 4:
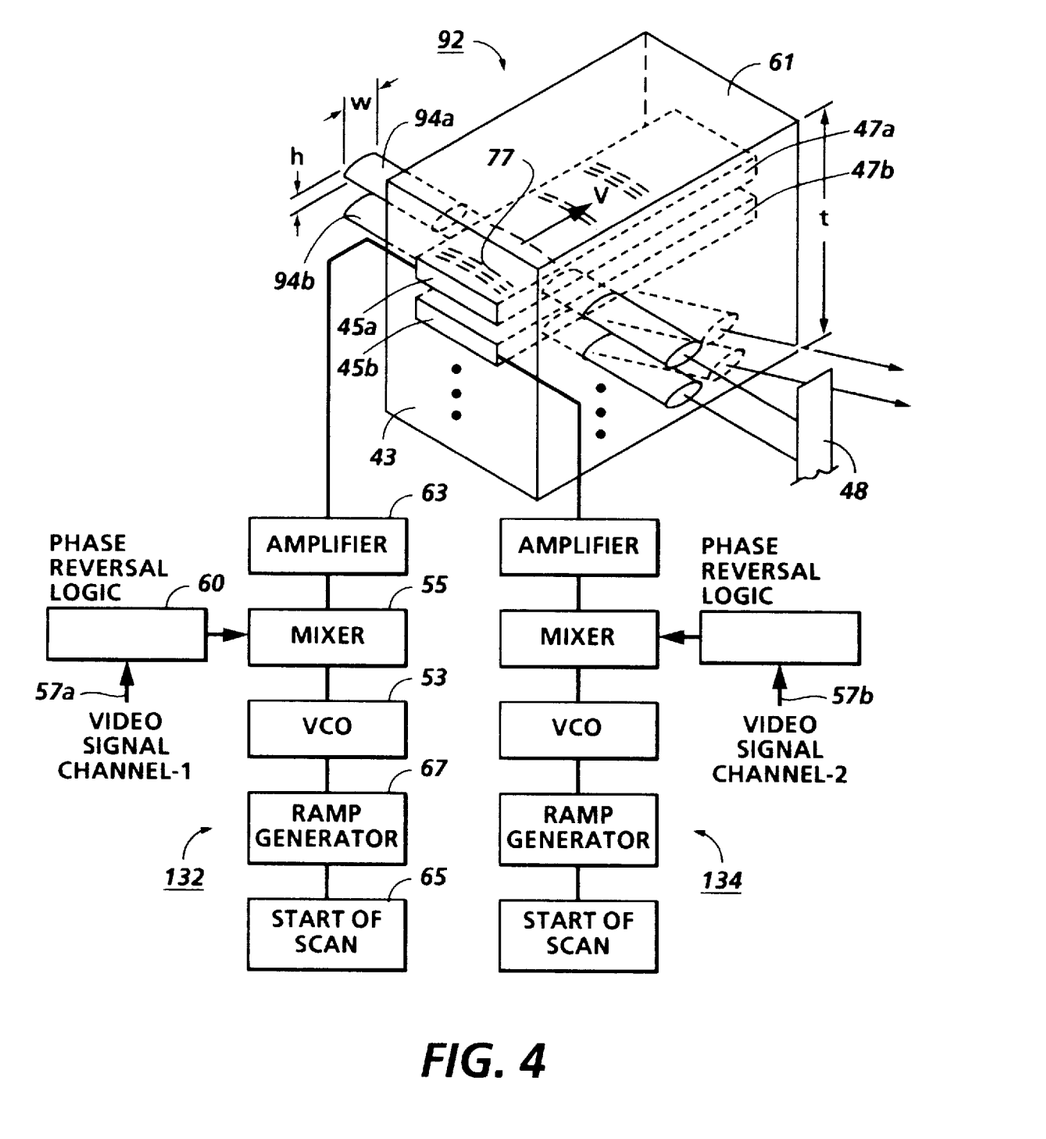
FIG. 4 is a partial isometric view of the multiple channel modulator of the raster output scanner shown in FIG. 3.

Referring particularly to FIG. 4 of the drawings, modulator 92 has a suitable acousto-optical substrate 61 which may be glass, plastic crystal, etc. The operating thickness (t) of modulator substrate 61 is sufficient to permit two separate, distinct, and non-overlapping modulating channels or sections 47a, 47b to be created for beams 94a and 94b respectively. The center to center separation between channels 47a, 47b is sufficient to prevent or at least minimize acoustic interference, such as crosstalk, between the neighboring acoustic channels. A transducer 45a, 45b is associated with each beam. Transducers 45a, 45b which may for example comprise electrically driven piezoelectric elements, are provided on one side 43 of substrate 61 by suitable means. Transducers 45a, 45b which are sized to provide optimum modulating performance, are positioned one above the other.

Each beam 94a, 94b entering modulator 92 interacts with the acoustic wave generated by the transducer for that beam and is modulated by the input video signals to the transducer. For each beam, the beam size in the cross scan direction must be small enough to fit in the sound field of the modulator defined by the acoustic channels 47a, 47b. In the fast scan direction, the beam should be large enough to illuminate as many video bits as possible for image quality, but as few as possible to avoid or reduce velocity mismatch tolerance. Typically, the beam size in the fast scan direction is about six to nine times the acoustic pulse width in the modulator.

Each transducer 45a, 45b has a driver 132, 134 respectively. Each driver has a Voltage Controlled Oscillator (VCO) 53 for generating high frequency rf signals, the output of VC 53 being fed to one input of a suitable mixer 55 for mixing the rf signal output of VCO 53 with the incoming video image signals. The video image signals are input through channels 57a, 57b to a second input of mixer 55. To accomplish facet tracking, a ramp generator 67 is connected to the VCO 53 for each transducer to vary the rf frequency linearly with time. The change of rf frequency will deflect the laser beam to follow the facet as the polygon 100 rotates.

A phase reverser 60 is provided in the video image signal channels 57a, 57b. Phase reverser 60, which comprises any suitable logic, reverses the polarity of successive or alternate video image signals thereby introducing a subharmonic component into the spatial frequency spectrum of the video signals at the facets 82 of the scanning polygon 100. This causes the scanning polygon facets, which act as a bandpass filter, to hold more image content that would otherwise be the case and increases the contrast ratio of the off and on/off images thereby improving the scan uniformity both in spot size and intensity. Concurrently, spot size asymmetry between the "on" and "off" pixels of the on/off images is reduced.

The output of mixer 55 is amplified by a suitable signal amplifier 63, the amplified output of each driver being coupled to the drive terminals of transducers 45a, 45b, respectively. Startup of drivers and the input of video image signals are controlled by a Start Of Scan (SOS) signal 65. SOS signal 65 may be produced, for example, by placing a suitable photosensor in the scanning path of beams 94a, 94b and using the output signal of the photosensor as a reference to identify the starting point at which writing of the image lines commences. The SOS signal 65 is input through a ramp generator 67 to the control gate of VCO 53, ramp generator 67 serving to vary the rf signal output of VCO 53 with time. This provides controlled deflection of the beams and causes the beams to follow or track on the polygon facets as polygon 80 rotates. Alternately, the End of Scan (EOS) signal may be used either individually or in combination with SOS signal 65 to identify the starting point for writing the image lines.

Referring again to FIG. 3, imaging optics 97 are used to image the modulated light beams from modulator 92 onto photoreceptor 98 in the scan direction. Imaging optics 97 includes an anamorphic lens 97a for focusing the first order beams and onto facets of the rotating scanning polygon 100 located at the Fourier transform plane of lens 97a and an anamorphic imaging lens 97b for imaging the reflected beams onto photoreceptor 98.

As the beams 94a and 94b of laser 90 reflected from polygon 100 to the photoreceptor 98, there would be a uniform sweep or uniform distribution of the light beam across the photoreceptor 98 if the photoreceptor was moving at a uniform speed. Unfortunately, the speed of the photoreceptor belt is often dependent upon power changes and the motor driving the belt or of the inherent changes in the driving components themselves. This results in a nonuniformity of the laser sweep across the photoreceptor resulting in image degradation.

The difficulty of speed errors is overcome by the use of a shaft encoder on the belt module to vary the modulation of the laser beam itself rather than directly control the belt speed in response to speed errors. The shaft encoder can be any suitable speed measuring device such as various well-known electromagnetic or electro-optic pulsing devices to produce signals representing the speed of a moving belt. For example, uniformly spaced holes about the photoreceptor belt or suitably spaced magnets rotated past a suitable mounted electromagnetic or photo-optic detector mounted on the frame of the machine can produce periodic pulses providing a measure of belt speed. Such a device is illustrated at 32 in FIG. 1.

However, as discussed above, perceptible errors still often exist, particularly in halftone and color images. These errors, manifested as banding or visible stripes, are accentuated as halftone dot frequency increases. Thus, at higher frequencies (especially above 60 Hz.), there is increased sensitivity of the eye to slight motion errors of a photreceptor belt. In the instant invention, compensation is provided by introducing random noise bands in the projected image by modifying the modulation of a scanning beam across the photosensitive surface.

Figure 5:
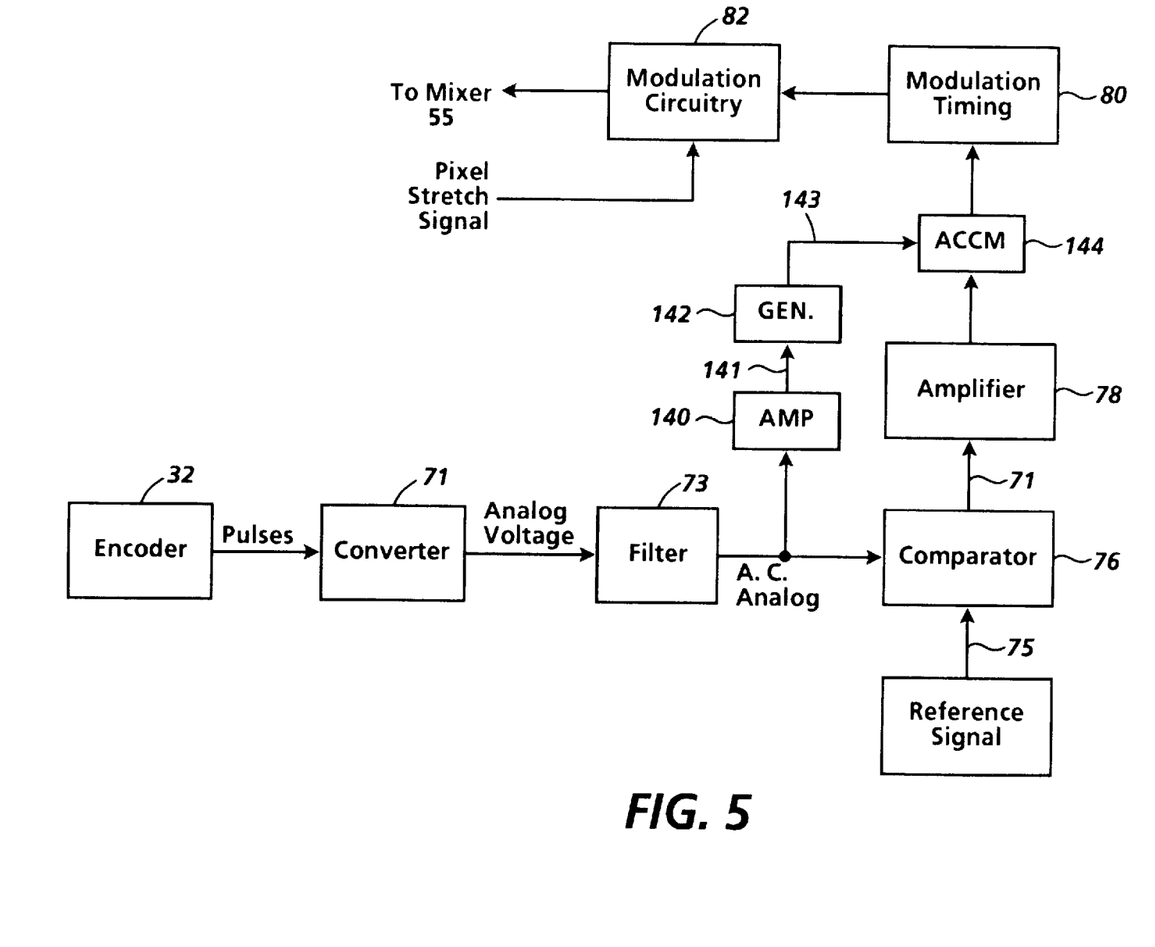
FIG. 5 is a block diagram of the system to compensate for banding errors in accordance with the present invention.

With respect to FIG. 5, the encoder 32 mounted adjacent the photoreceptor belt, produces approximately 2,500 pulses per revolution at normal or standard speed. These pulses are applied to a frequency to voltage converter 71 converting the pulses into an analog voltage which in turn is applied to filter circuitry illustrated at 73. The filter circuitry 73 filters the DC component of the analog voltage to provide an AC voltage analog. This analog voltage is converted to an error signal 77 by comparing to a uniform speed DC reference signal 75 at a comparator 76. At amplifier 78, the error signal 77 is amplified and conveyed as one input to signal accumulator 144.

In accordance with the present invention, the AC voltage analog signal provided by filter 73 is conveyed also to amplifier 140 as well as to comparator 76. A speed change signal illustrated at 141 is input to random noise generator 142 from amplifier 140. The noise generator 142 is any suitable random signal generator to provide a random peak to peak amplitude signal or random frequency signal. Random noise generator 142 injects a random signal called white noise into the system to break up perceptible image bands on copysheets caused by small motion errors and not eliminated by any other compensation scheme. In response to speed change signal 141, random noise generator 142 produces a second signal input, illustrated at 143, to accumulator 144.

The accumulator 144 responds to the signals from both amplifier 78 and random noise generator 142 to provide a composite signal to modulation timing circuitry 80. The modulation timing circuitry 80 converts the signal from accumulator 144 into a delta change signal 81. The delta change signal 81 is applied to modulation change circuitry 82 in order to apply the correct partial pulses in the direction of motion of the photoreceptor belt or the laser beam to offset the variations in photoreceptor speed and compensate for banding errors on the finished copy. This signal in turn is applied to the mixer 55 to be amplified and to modulate the beam through modulators 94a and 94b.

Figure 6:
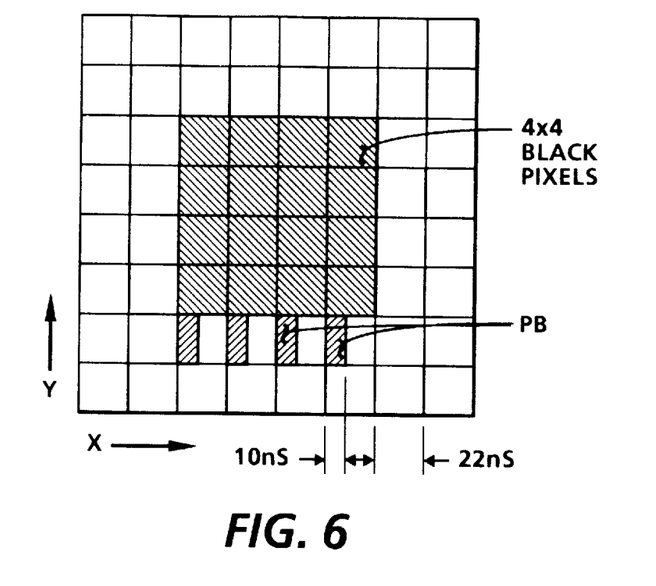
FIG. 6 illustrates the pixel change technique to enhance image quality in one direction.
Figure 7:
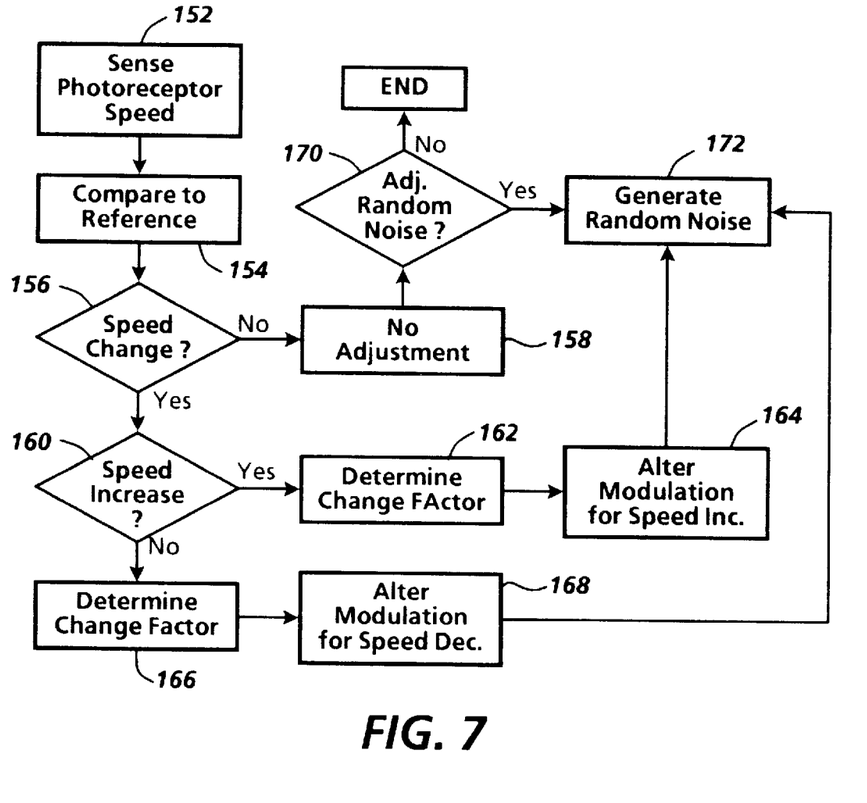
FIG. 7 is a flow chart illustrating modulation change in accordance with the present invention.

With reference to FIG. 6, there is illustrated a portion of a scanned image, each square representing either a black B or white W pixel. As shown in FIG. 7, there is a 4×4 black pixel area surrounded by a white pixel area. Changes in photoreceptor belt speeds are compensated by pixel modulation changes in the Y direction or slow scan direction. For example, assume that an increased speed has constricted or narrowed the black lines or areas in the reproduced image. In this case the effect of an increase in the width of the black line in the Y-direction is shown as being achieved by scanning partial black dots or pixels PB as illustrated. That is, a partial pixel in the X-direction in each next adjoining pixel area to the black pixels in the Y-direction are provided. Typically, a 20 nanosecond period for the black pixel in the X-direction is provided for the entire area of the pixel area in the Y-direction.

Compensation for banding by introduction of white noise by the random signal generator 142 follows the same principle in either the fast scan (beam scan ) X direction or slow scan Y direction.This is accomplished by scanning partial black dots or pixels PB as illustrated in FIG. 6. That is, partial pixels in the Y direction or X-direction in each next adjoining pixel area to the black pixels are provided.

FIG. 7 is a flow chart illustrating the modulation change technique. At 152 the photoceptor speed is sensed and compared to a reference at 154. At 156, a determination of photoceptor speed change is made. If no change, then no modulation adjustment is made for speed changes as shown at 158. However, a suitable random signal adjustment may be required as shown at decision block 170. If required, suitable random noise is generated as shown at block 172 to compensate for perceptible noise bands. If there is a speed change determined, as illustrated at 156, then an increase or decrease is determined as shown at decision block 160.

If there is an increase in speed, then a change factor for an increase in speed is made at 162, an appropriate alteration of the modulation is made as shown at 164 to compensate for increased speed, and an appropriate random noise signal is also generated as shown at block 172. That is, a determination is made as to the timing and location of partial block pixels to be made by the modulation circuitry 82. In a similar manner, if there is a decrease in speed, then a change factor for a decrease in speed is made at 168, an appropriate alteration of the modulation is made as shown at 168 to compensate for decreased speed, and an appropriate random noise signal is generated as shown at block 172.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

I claim:

1. In a printing machine having a moving photosensitive surface, a raster scanning system for scanning a beam across the photosensitive surface, a modulator for modifying the scanning beam to project a halftone image onto the photosensitive surface, a sensor mounted adjacent to the photosensitive surface providing signals in relation to the speed of the photosensitive surface, a comparator responsive to said signals for determining a change of speed of the photosensitive surface in relation to a reference speed, a converter connected to the comparator and responsive to a change in speed to provide a signal representing an image quality factor, and means responsive to the signal representing the image quality factor for altering the modulation of the beam of the scanning system to adjust the projected image, the improvement comprising a random signal generator responsive to said signals in relation to the speed of the photosensitive surface for generating a random frequency signal, the random frequency signal altering the modulation of the beam of the scanning system to nullify banding errors on the projected image.

2. The printing machine of claim 1 wherein the frequency of the random signal is greater than 60 Hz.

3. The printing machine of claim 1 wherein the random frequency signal provides random noise bands to the projected image.

4. The printing machine of claim 3 wherein the random noise bands repress noise bands in the projected image caused by photosensitive surface motion errors.

5. In a printing machine having a moving photosensitive surface, a raster scanning system for scanning a beam across the photosensitive surface, a modulator for modifying the scanning beam to project a halftone image onto the photosensitive surface, a sensor providing sensor signals in relation to the speed of the photosensitive surface, a converter responsive to the speed of the photosensitive surface to provide a signal representing an image quality factor, and means responsive to the signal representing the image quality factor for altering the modulation of the beam of the scanning system to adjust the projected image, the projected image including banding errors, the improvement comprising a random signal generator responsive to the sensor signals in relation to the speed of the photosensitive surface for generating random signals, the random signals altering the modulation of the beam of the scanning system to counter the banding errors on the projected image.

6. The printing machine of claim 5 wherein the random signal generator provides a random amplitude signal.

7. The printing machine of claim 5 wherein the random signal generator provides a random frequency signal.

8. A printing machine having a moving photosensitive surface, a raster scanning system for scanning a beam across the photosensitive surface, a modulator for modifying the scanning beam to project an image onto the photosensitive surface, a sensor mounted adjacent to the photosensitive surface providing signals in relation to speed of the photosensitive surface, a comparator responsive to said signals for determining the change of speed of the photosensitive surface in relation to a reference speed the improvement comprising, a random signal generator responsive to said signals for generating a random signal, the comparator and random signal generator providing a first quality factor and a second quality factor for altering the modulation of the beam of the scanning system to adjust the projected image.

9. The printing machine of claim 8 wherein the random signal generator provides a random frequency signal.

10. The printing machine of claim 8 wherein the random signal generator provides a random amplitude signal.

11. The printing machine of claim 8 wherein the first and second quality factors provide a modulation time change.

12. The printing machine of claim 8 wherein the random signal generator provides random noise bands to the projected image.

13. The printing machine of claim 12 wherein the noise bands provided by the generator repress noise bands in the projected image caused by photosensitive surface motion errors.

14. The printing machine of claim 8 wherein the frequency of the random signal generator signals is greater than 60 Hz.

15. In a printing machine having a moving photosensitive surface and a raster scanning system for modulating a beam and scanning an image on the photosensitive surface, the image including an array of pixels, a method of compensating for changes to the quality of the image scanned onto the surface comprising the steps of:

measuring the speed of the photosensitive surface, comparing the speed with a reference speed to determine a change of speed of the photosensitive surface, providing an error signal responsive to the change of speed of the photosensitive surface, providing a random frequency signal, the random frequency signal and the error signal representing an image quality factor, and altering the modulation of the beam of the scanning system in response to the image quality factor by varying the modulation timing to modify selected pixels of the array of pixels.

16. The method of claim 15 wherein the image is a halftone image and wherein the step of altering the modulation timing includes the step of adding partial black pixels to other black pixels.

17. A system for compensating for motion errors that degrade image quality by modifying modulation of a scanning beam across a photosensitive surface in response to changes in speed of the photosensitive surface and by introduction of random noise into a projected image comprising:

a sensor providing signals and mounted adjacent to the photosensitive surface to determine the speed of the photosensitive surface, a comparator electrically connected to the sensor for determining a change of speed of the photosensitive surface in relation to a standard speed, means responsive to the change in speed to provide a signal representing an image quality factor, a random noise generator responsive to said signals provided by said sensor, and a modulator responsive to the image quality factor and the random noise generator for changing the image by modulating said scanning beam.

18. In an electronic imaging device having a moving photosensitive surface and means for modulating an image onto the photosensitive surface, the image including an array of pixels, a method of compensating for changes to the quality of the image scanned by changes of speed of the surface comprising the steps of:

measuring the speed of the photosensitive surface, comparing the speed with a reference speed to determine a change of speed of the photosensitive, surface, providing an error signal responsive to the change of speed of the photosensitive surface, the error signal representing an image quality factor, introducing random noise signals, and altering the modulation of the image in response to the image quality factor and the random noise signals by varying the modulation timing to modify selected pixels of the array of pixels.

19. The method of claim 18 wherein the image is a plurality of black and white pixels and wherein the step of altering the modulation timing includes the step of adding partial black pixels to black pixels.

20. In a printing machine having a moving photosensitive surface and a raster scanning system for modulating a beam and scanning a halftone image on the photosensitive surface, the image including an array of pixels, a method of compensating for banding errors to the quality of the image scanned onto the surface comprising the steps of:

measuring the speed of the photosensitive surface, comparing the speed with a reference speed to determine a change of speed of the photosensitive surface, providing an error signal responsive to the change of speed of the photosensitive surface, providing a random frequency signal, the random frequency signal representing an image quality factor, and altering the modulation of the beam of the scanning system in response to the image quality factor by varying modulation timing to modify selected pixels of the array of pixels.

* * * * *